(12) United States Patent
Rodrigues

(10) Patent No.: US 6,491,148 B2
(45) Date of Patent: Dec. 10, 2002

(54) MANUAL OVERRIDE DEVICE, IN PARTICULAR FOR AIRCRAFT FLIGHT CONTROL

(76) Inventor: Fernand Rodrigues, 7, impasse des Troënes, 95230 Montmorency Sous Bois (FR)

(*) Notice: Subject to any disclaimer, the term of this patent is extended or adjusted under 35 U.S.C. 154(b) by 0 days.

(21) Appl. No.: 09/728,355

(22) Filed: Dec. 1, 2000

(65) Prior Publication Data

US 2001/0002687 A1 Jun. 7, 2001

(30) Foreign Application Priority Data

Dec. 2, 1999 (FR) .............................. 99 15308

(51) Int. Cl.$^7$ ................................ B64C 13/00
(52) U.S. Cl. ................ 192/48.5; 74/625; 192/48.9; 192/8.21; 192/107 M; 244/197
(58) Field of Search ............... 192/48.5, 48.9, 192/70.23, 89.21, 107 M; 244/197; 74/625

(56) References Cited

U.S. PATENT DOCUMENTS

| | | | |
|---|---|---|---|
| 2,570,585 A | 10/1951 | Murphy | |
| 3,091,316 A | 5/1963 | Huffman | |
| 3,099,338 A * | 7/1963 | Urquhart | 74/625 |
| 4,022,309 A * | 5/1977 | Denkowski et al. | 192/48.5 |
| 4,393,965 A * | 7/1983 | Zouzoulas | 74/625 |
| 4,429,591 A * | 2/1984 | Zuch et al. | 74/625 |
| 4,474,078 A * | 10/1984 | Denkowski et al. | 74/625 |
| 5,769,362 A | 6/1998 | Greene et al. | |
| 5,860,890 A * | 1/1999 | Antonov | 192/107 M |
| 6,231,113 B1 * | 5/2001 | Armbruster et al. | 192/89.21 |

* cited by examiner

*Primary Examiner*—Rodney H. Bonck
(74) *Attorney, Agent, or Firm*—Blakely Sokoloff Taylor & Zafman

(57) ABSTRACT

An override device is presented having a manual control, an inlet gear, and an outlet gear, which are mounted to rotate about the same axis. The inlet gear rotates the outlet gear. The manual control has a cam which, in co-operation with an intermediate part suitable for following the cam, serves to disengage the rotation of the inlet gear under torque exerted on the manual control. The manual control drives the outlet gear. The Inlet gear rotates by having a set of friction disks and spring part suitable for exerting a force to compress the disks against one another. The intermediate part carries at least one pusher-forming element, which at the end of a displacement exerts force opposing that of the spring part and relaxes the friction force on at least some of the disks.

12 Claims, 5 Drawing Sheets

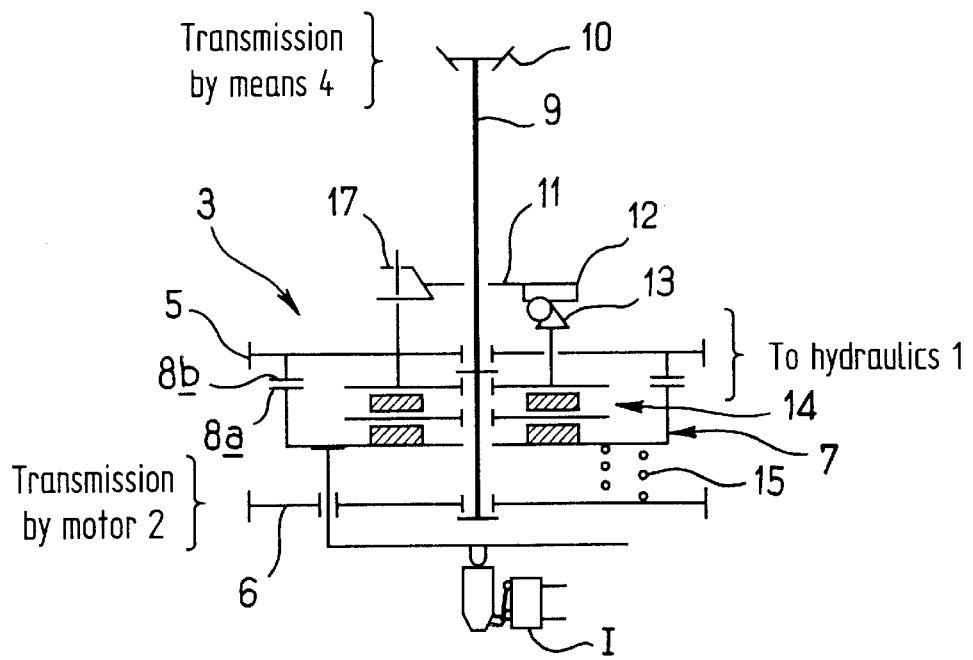
FIG_2a (PRIOR ART)
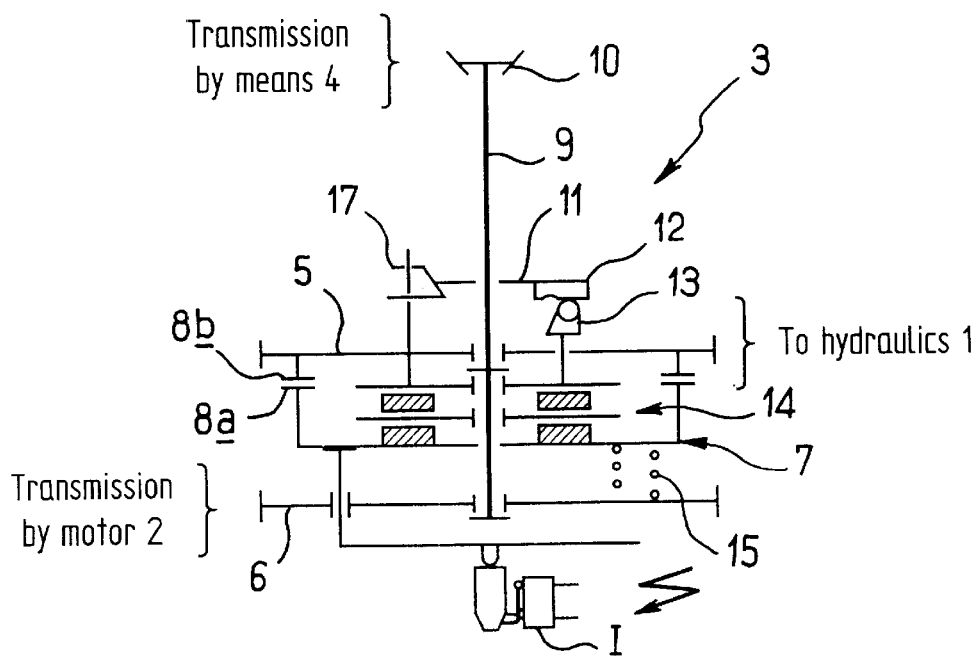
FIG_2b (PRIOR ART)

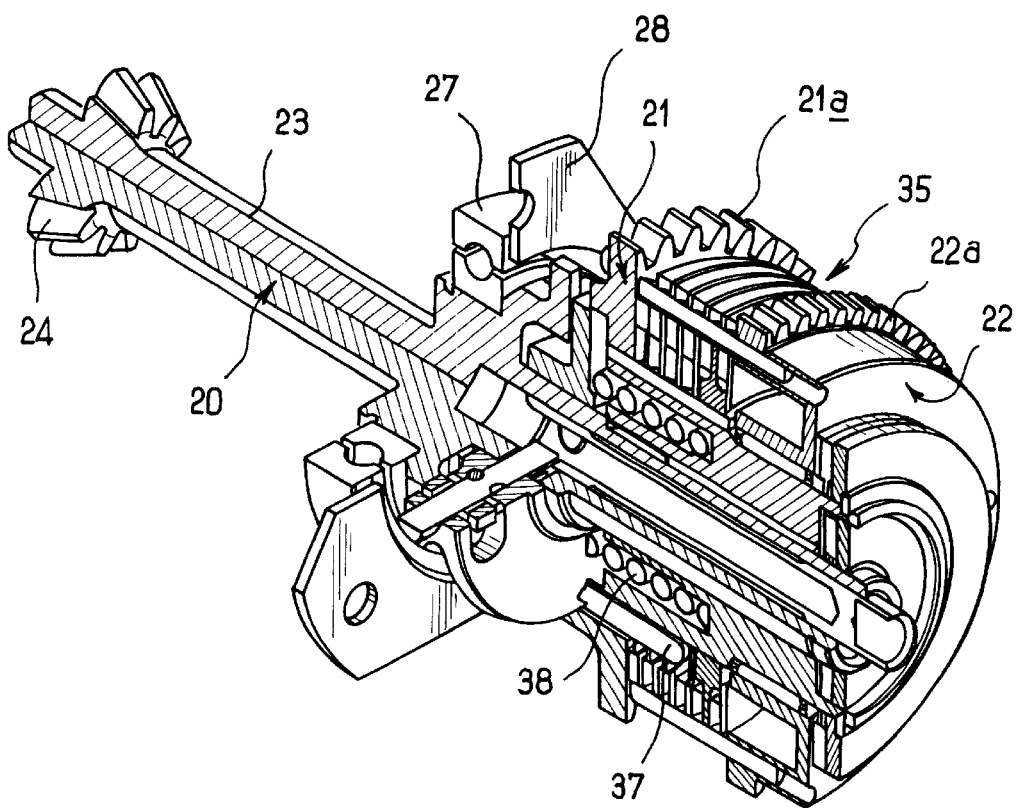
FIG_3

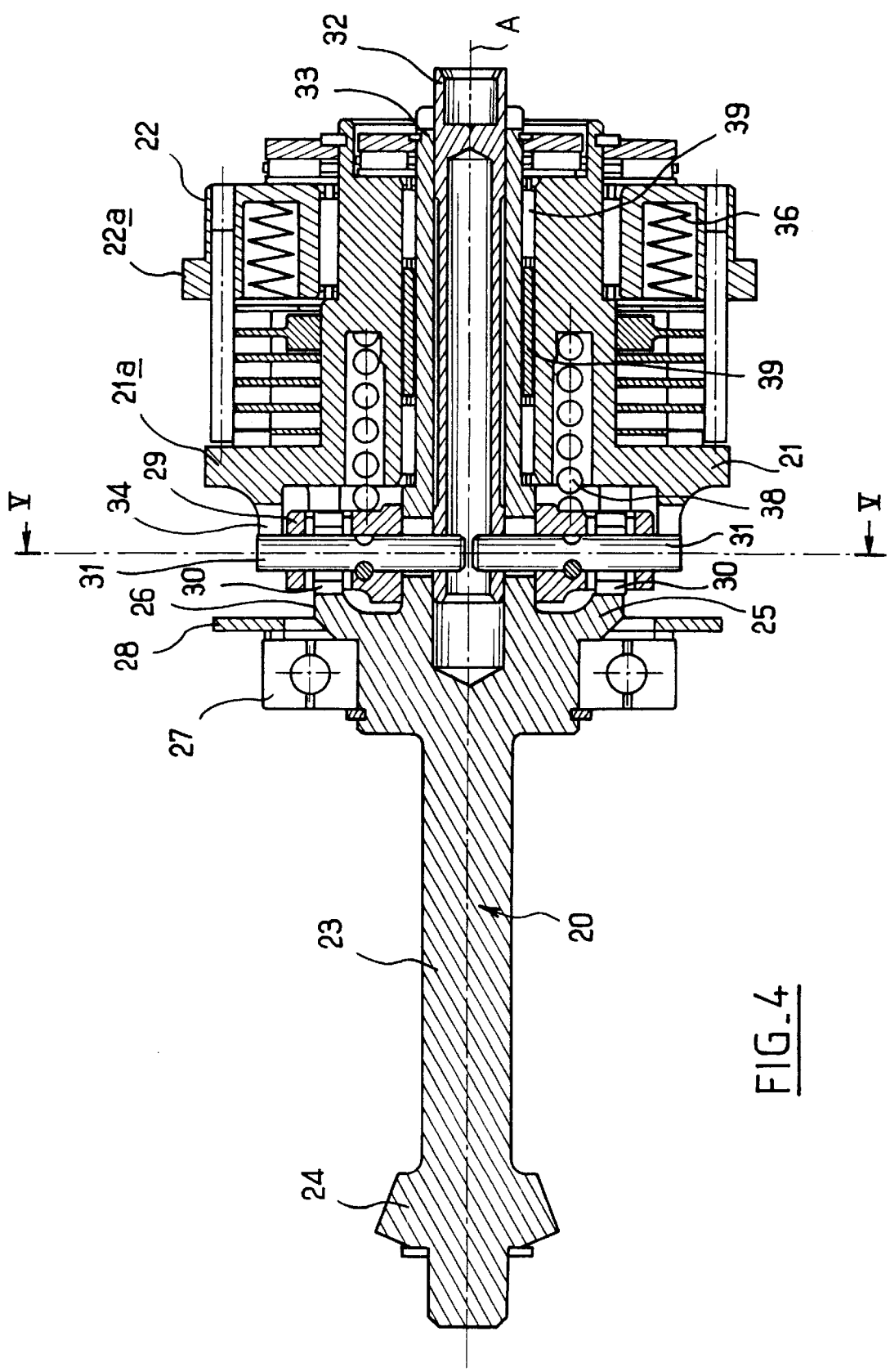
FIG_4

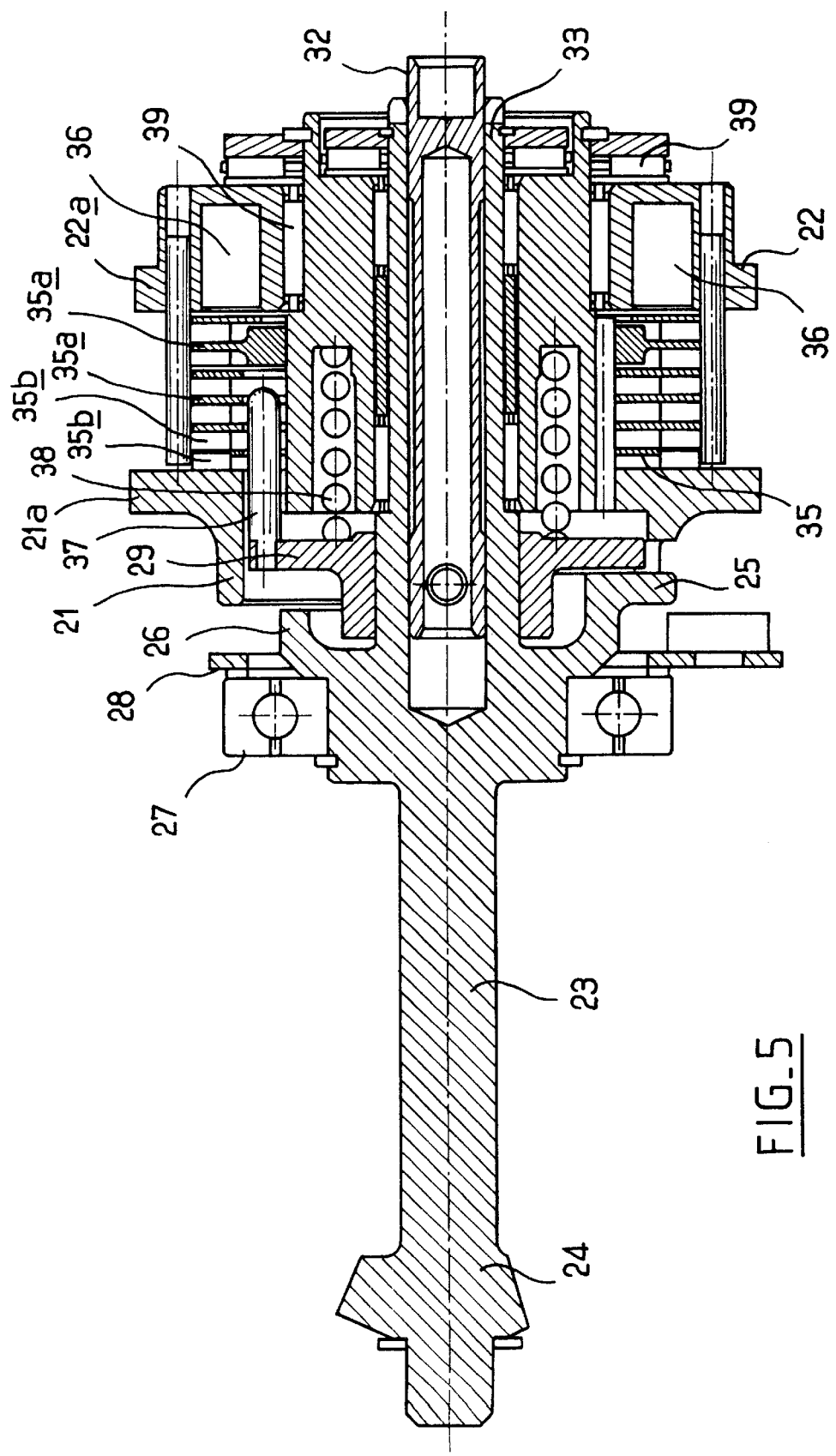
FIG_5

MANUAL OVERRIDE DEVICE, IN PARTICULAR FOR AIRCRAFT FLIGHT CONTROL

BACKGROUND OF THE INVENTION

Override devices are already known, in particular for certain hydraulic flight controls and in particular for pitch control surfaces, that enable the pilot to take over from the electric motor which in normal operation actuates the hydraulic circuit of the control.

FIG. 1 is a diagram of a control unit comprising a hydraulic control valve 1, an electric motor 2, and an override device 3.

The valve 1 is actuated in normal operation by the electric motor 2, which in turn is controlled by a flight control computer.

The override device 3 enables the pilot to take over from the electric motor 2 and the computer and to impose manual control on the pitch control surface, in particular by acting on control means 4.

FIGS. 2a and 2b are diagrams showing an override device which is presently in use with the pitch control surfaces of certain airplanes.

The device 3 comprises:
- an outlet gear 5 which meshes with complementary means of the hydraulic control valve 1;
- an inlet gear 6 which lies on the same axis as the gear 5 and which meshes with complementary means of a transmission system driven by the electric motor 2;
- an intermediate assembly 7 which is interposed between the two gears 5 and 6 and lies on the same axis; this assembly 7 is rotated by the inlet gear 6; it has a set of fluting 8a which co-operates with complementary fluting 8b on the outlet gear 5 so that in normal operation the inlet gear 6 drives the outlet gear 5 via said intermediate assembly 7; and
- a shaft 9 lying on the axis of the gears 5 and 6 and of the intermediate assembly 7; this shaft 9 carries a gear 10 which co-operates with complementary means of a transmission system enabling the actuator means 4 to drive said shaft 9; it also includes a plate 11 having a cam 12 against which there bears a cam follower 13 carried by the intermediate assembly 7; it also includes abutment-forming means represented by a fork 17 in FIGS. 2a and 2b, enabling the shaft 9 to rotate the gear 6 when the pilot acts on the shaft 9.

Particularly when the pilot acts on the shaft 9 via the means 4, the cam follower 13 runs along the cam 12 so that the intermediate assembly 7 is pushed back from the gear 5. The complementary fluting 8a, 8b uncouples. The outlet gear 5 is no longer driven by the electric motor 2. Rotation of said gear 5 is then controlled by the pilot causing abutments represented by the fork 17 to come into abutment, thereby controlling the movement which is imparted to the pitch control surface via the hydraulic system.

Provision is also made for the intermediate assembly to include a set of friction disks 14, with the friction disks being brought into engagement with one another by compression from a helical spring 15 interposed between said assembly 7 and said gear 6 when the cam-follower means 13 move over the cam 12 and the intermediate assembly 7 is pushed back towards the inlet gear 6. These sets of friction disks then enable a certain amount of friction to be maintained between the gears 5 and 6 throughout the time that manual control is being applied, however the gear 6 does not drive the gear 5 unless the pilot releases the force exerted on the inlet shaft 9 via the means 4.

The intermediate assembly also carries pusher means which act on switches I to activate a given signal inside the cockpit when the pilot acts on the manual control means and the intermediate assembly is displaced.

Nevertheless, an override device of the type described above is expensive to make.

OBJECTS AND SUMMARY OF THE INVENTION

An object of the invention is to propose a structure for an override device which is simplified and less expensive to make.

Another object of the invention is to propose a structure for an override device which provides manual control giving the pilot control sensations that are similar to those of a conventional manual control.

Thus, the invention provides an override device, in particular for flight controls, comprising a manual control part, an inlet gear part, and an outlet gear part which are mounted to rotate about the same axis, means being interposed between the inlet gear part and the outlet gear part so that in normal operation the inlet gear part rotates the outlet gear part, the manual control part also carrying a cam which, in co-operation with complementary means of an intermediate part suitable for following said cam, serves to disengage the means interposed between the inlet gear part and the outlet gear part under the effect of torque exerted on the manual control part, the device also having means then enabling the manual control part to drive the outlet gear part.

In the device proposed by the invention the drive means interposed between the inlet gear part and the outlet gear part comprise a set of friction disks and spring means suitable for exerting a force to compress said disks against one another, and the intermediate part suitable for following the cam carries at least one pusher-forming element which, at the end of a displacement of the intermediate part relative to the cam under drive from torque exerted on the manual control part exerts force opposing that of the spring means and relaxes the friction force on at least some of the disks.

Such a device is simplified in structure compared with the structure described with reference to FIGS. 2a and 2b: in particular, it does not require parts to be manufactured having drive fluting; the outlet part is driven by the inlet part via the set of friction disks.

Furthermore, the number of parts is smaller.

Such a device is advantageously associated with the various characteristics below taken singly or in any technically feasible combination:

- the intermediate part includes abutment-forming means which, at the end of a displacement of the intermediate part relative to the cam under drive from torque exerted on the manual control part, come to bear against at least one complementary surface of the outlet part, the manual control part then driving the intermediate part and the outlet part;
- a portion of the friction disks has a bearing zone against which the pusher-forming element comes to bear at the end of a displacement of the intermediate part relative to the cam; in this way, the inlet part always opposes the torque exerted by the pilot on the manual control part by means of a force of opposite sign which is transmitted thereto via the friction disks that remain in engagement, from the pusher-forming element and the intermediate part; this friction is important insofar as it provides the pilot with reaction relative to which the pilot can adjust the force applied;

the other friction disks have a recess passing through them to allow the pusher-forming element to be displaced;

the set of friction disks comprises a plurality of carbon disks alternating with metal disks;

the set of friction disks includes at least five carbon disks;

the pusher-forming element comes to bear against two disks of the set of friction disks;

the intermediate part carries two cam-follower wheels which run on the cam;

the wheels have axles constituting pins suitable for coming to bear against complementary surfaces of the outlet part;

the axles of the wheels constitute pins which are engaged in a cylindrical part slidably mounted in a sheath which extends the manual control part along its axis, said cylindrical part being driven to slide relative to said sheath when the intermediate part moves relative to the cam and constituting a pusher suitable for controlling the switching of at least one switch; and the device includes a helical spring which is interposed coaxially between the intermediate part and the outlet part and which provides return displacement of the intermediate part relative to the cam when the force on the manual control part is released.

BRIEF DESCRIPTION OF THE DRAWINGS

Other characteristics and advantages of the invention will appear on reading the following description. This description is purely illustrative and non-limiting and should be read with reference to the accompanying drawings, in which:

FIGS. 2a and 2b are diagrams illustrating the structure of an override device which gives rise to a certain number of problems that the invention seeks to resolve;

FIG. 3 is diagrammatic perspective view of an override assembly constituting one possible embodiment of the invention;

FIG. 4 is a diagrammatic longitudinal section view of the override assembly of FIG. 3; and FIG. 5 is a longitudinal section view at right angles to FIG. 4.

MORE DETAILED DESCRIPTION

Figure 1:
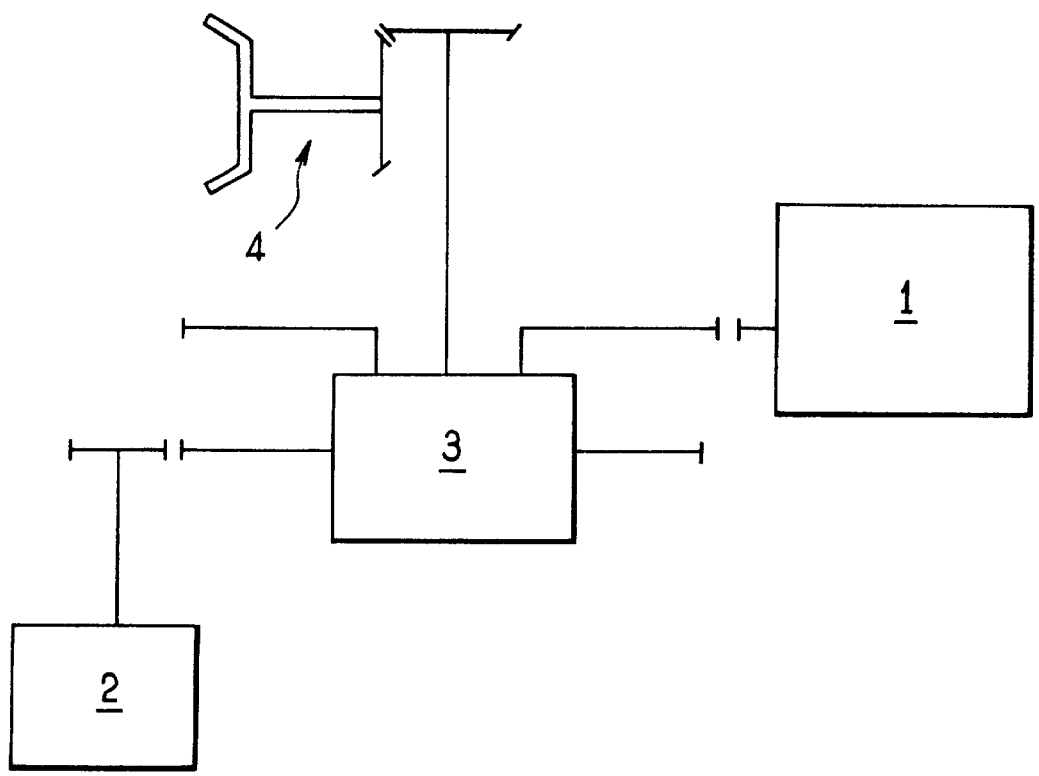
FIG. 1, described above, is a block diagram showing the disposition of an override device in a control system.

The override device shown in FIGS. 3 to 5 comprises a manual inlet control part 20, an outlet gear part 21 having a portion 21a which constitutes a gear which co-operates with complementary means of a transmission system enabling said gear 21a to actuate the valve of a hydraulic flight control circuit, and an inlet gear part 22 having a portion 22a which constitutes a gear which co-operates with complementary means of a transmission system enabling an electric motor to drive said inlet part 22.

The manual control part 20 comprises a shaft 23 carrying a gear 24 for meshing with gearing mechanically connected to a pilot's control stick.

This part 20 is mounted in a bearing 27 fixed to the structure of the override device, referenced 28. The bearing 27 allows said part 20 to pivot about the axis, referenced A, of its shaft 23.

The parts 21 and 22 are coaxial about the part 20 and are mounted inside the structure 28 so as to be capable of rotating about their axis.

The shaft 23 also carries a plate 25 which extends transversely relative to the axis of said shaft 23 and which defines a camming ramp 26.

An intermediate part 29 carrying cam followers is interposed between the plate 25 and the outlet part 21.

The part 29 is generally in the form of a disk about the same axis as the parts 20 and 21.

It carries two cam-follower wheels 30 which are diametrically opposite each other on the part 29 and which are mounted to rotate on axles 31 that extend radially relative to the axis of the shaft 23.

These two cam-follower wheels 30 run on the ramp of the cam 26 on the plate 25, the parts 20 and 21 being shaped in such a manner as to enable the part 29 to move along its axis from one position to another between the parts 20 and 21 when the said part 29 turns relative to the part 20 and the cam-follower wheels 30 run along the ramp of the cam 26.

In this respect, it can be observed that the cam 26 could present a succession of different slopes. In a variant, it could have a slope that varies without discontinuity, thus enabling manual control movements to be progressive, without sudden jumps in the torque to be exerted by the pilot.

The cam-follower wheels 30 rotate on axles 31 that also constitute pins whose ends closer to the axis of the parts 20 and 29 are engaged in a cylindrical part 32 forming a pusher which extends in a complementary sheath 33 which extends the plate 25 axially from the side of said plate facing away from the shaft 23. The pins constituted by these axles 31 thus enable the intermediate part 29 to drive the cylindrical part 32 in axial displacement. The displacement of the pusher constituted by said cylindrical part 32 serves, when said pusher moves out from its sheath, to actuate switches (not shown) which are located in register with the pusher and which cause visual or audible signals to be triggered in the cockpit to indicate that manual control is overriding electrical control.

Furthermore, the axles 31 constitute pins which come into abutment at their ends remote from the axis of the parts 20 and 29 against complementary bearing surfaces 34 presented by the outlet part 21. Thus, when the pilot exerts torque on the part 20, the intermediate part 29 turns relative to the outlet part 21 until it comes into abutment against the bearing surfaces of the outlet part 21. At that moment, the cam-follower wheels 30 follow the ramp of the cam 26 to an abutment position, and then the part 20 drives the outlet part 21 via the pins constituted by the axles 31.

In addition, a helical spring 38 is mounted between the cam-follower intermediate part 29 and the outlet part 21. The helical spring 38 enables the cam-follower intermediate part 29 to be pushed back into its position where it is spaced apart from the part 21, whenever the pilot ceases to apply force on the part 20.

A set of friction disks 35 is interposed between the outlet part 21 and the inlet part 22.

This set of friction disks 35 is constituted by five friction disks 35a of carbon interposed between six metal friction disks 35b which are pressed against one another by springs 36 received in recesses provided for this purpose in the inlet part 22.

These springs 36, which are helical springs for example, exert force against the friction disks parallel to the axis of the parts of the device so that the friction disks are normally engaged with one another, the inlet gear 22 rotating the outlet gear 21.

The cam-follower intermediate part 29 also has a pusher element 37 which extends parallel to the axis A in a recess provided for this purpose through the first nine superposed friction disks 25 starting from the part 21.

This pusher element 37 is of a length such as to bear against the last two friction disks of the set of disks 35 when the intermediate part 29 is moved along the axis A to its position in which it is closest to the part 21 due to the cam followers 30 running along the ramp of the cam 26.

Thus, in this position of the cam-follower part 29, only the last two friction disks are engaged and the other friction disks are released. Consequently, the part 22 no longer drives the part 21; at the same time, friction force is transmitted by the part 22 to the manual control part 20 via the last two friction disks and the intermediate part 29 so that the pilot feels a certain amount of torque opposing the movement being applied manually to the inlet part 20.

It should also be observed that a certain number of roller bearings 39 are provided in the device so as to ensure excellent rotation of the various parts of the device. In addition, the entire structure is maintained in a bath of oil which also contributes to avoiding any friction.

The structure described above operates as follows.

In normal operation, the inlet part 22 drives the outlet part 21 via the friction disks 35 which are then all kept in engagement by the springs 36.

Consequently, the hydraulic circuit valve is controlled by the electric motor which is itself controlled by the flight control computer of the aircraft.

When the pilot decides to take over from the electric motor and the computer, the force applied to the part 20 serves initially to drive the cam-follower part 29 in rotation relative to the part 21 until the axles 31 come into abutment against the complementary bearing surfaces of said part 21. The cam-follower part 29 is then blocked by said part 21 so that the part 20 turns relative to the said intermediate part 29 and the cam followers 30 run along the ramp 26 of the plate 25. The pusher 37 is then advanced along its housing through the friction disks 35 and comes to bear against the last two friction disks, against which it exerts a force opposing the force of the springs 36. The force exerted on the other friction disks is then released so that the part 22 no longer drives the part 21 while a friction force is transmitted between the part 22 and the part 20 via the last two friction disks and the pusher 37.

At that moment, the part 21 is driven by the torque imposed by the pilot on the part 20.

The pusher 32 is extended so that the switches controlling signals inside the cockpit are activated.

When the pilot ceases to apply force to the manual control part 20, the spring 38 returns the cam-follower part 29 so that it moves back into its initial position relative to the part 20.

The pusher 37 disengages from the last two friction disks and the springs 36 again apply their force to all of the friction disks 35. The part 22 again drives the part 21 via the friction disks 35.

It will be observed that the structure of the override device described above enables the pilot to exert control with a relatively small amount of actuating torque (e.g. about 0.2 newton-meters (Nm)).

The override device is described above in the context of an aircraft flight control since that is one of its preferred applications. Nevertheless, it can find applications of a more general nature in all circumstances where it can be necessary to make provision for manual override in a transmission system that is normally driven by an electric motor.

What is claimed is:

1. An override device comprising a manual control part, an inlet gear part, and an outlet gear part which are mounted to rotate about the same axis, drive means being interposed between the inlet gear part and the outlet gear part so that in normal operation the inlet gear part rotates the outlet gear part, the manual control part also carrying a cam which, in co-operation with complementary means of an intermediate part suitable for following said cam, serves to disengage the drive means interposed between the inlet gear part and the outlet gear part under the effect of torque exerted on the manual control part, the device also having means then enabling the manual control part to drive the outlet gear part, wherein the drive means interposed between the inlet gear part and the outlet gear part comprise a set of friction disks and spring means suitable for exerting a force to compress said disks against one another, and wherein the intermediate part suitable for following the cam carries at least one pusher-forming element which, at the end of a displacement of the intermediate part relative to the cam under drive from torque exerted on the manual control part exerts force opposing that of the spring means and relaxes the friction force on at least some of the disks.

2. A device according to claim 1, wherein the intermediate part includes abutment-forming means which, at the end of a displacement of the intermediate part relative to the cam under drive from torque exerted on the manual control part, come to bear against at least one complementary surface of the outlet part, the manual control part then driving the intermediate part and the outlet part.

3. A device according to claim 2, wherein the intermediate part carries two cam-follower wheels which run on the cam, and wherein the wheels have axles constituting pins suitable for coming to bear against complementary surfaces of the outlet part.

4. A device according to claim 2, wherein a portion of the friction disks has a bearing zone against which the pusher-forming element comes to bear at the end of a displacement of the intermediate part relative to the cam.

5. A device according to claim 4, wherein the set of friction disks includes at least five carbon disks, and wherein the pusher-forming element comes to bear against two disks of the set of friction disks.

6. A device according to claim 4, wherein the other friction disks have a recess passing through them to allow the pusher-forming element to be displaced.

7. A device according to claim 1, wherein the set of friction disks comprises a plurality of carbon disks alternating with metal disks.

8. A device according to claim 7, wherein the set of friction disks includes at least five carbon disks.

9. A device according to claim 1, wherein the intermediate part carries two cam-follower wheels which run on the cam.

10. A device according to claim 9, wherein the axles of the wheels constitute pins which are engaged in a cylindrical part slidably mounted in a sheath which extends the manual control part along its axis, said cylindrical part being driven to slide relative to said sheath when the intermediate part moves relative to the cam and constituting a pusher suitable for controlling the switching of at least one switch.

11. A device according to claim 1, including a helical spring which is interposed coaxially between the intermediate part and the outlet part and which provides return displacement of the intermediate part relative to the cam when the force on the manual control part is released.

12. An override device for a flight control and constituted by a device according to claim 1.

* * * * *

UNITED STATES PATENT AND TRADEMARK OFFICE
CERTIFICATE OF CORRECTION

PATENT NO.   : 6,491,148 B2
DATED        : December 10, 2002
INVENTOR(S)  : Rodrigues et al.

It is certified that error appears in the above-identified patent and that said Letters Patent is hereby corrected as shown below:

Title page,
Insert Item:
-- [73] Assignee: TRW Systemes Aeronautiques Civils, Cergy-Pontoise Cedex (France) --.

Signed and Sealed this

First Day of March, 2005

JON W. DUDAS
*Director of the United States Patent and Trademark Office*